United States Patent [19]

Jarvinen et al.

[11] 3,832,750
[45] Sept. 3, 1974

[54] HEADLIGHT WIPER

[76] Inventors: Uro Tapio Jarvinen, Satunavagen 18; Olli Olavi Salminen, Valstavagen 58, both of 19500 Marsta, Sweden

[22] Filed: Mar. 20, 1973

[21] Appl. No.: 343,176

[30] Foreign Application Priority Data
Mar. 27, 1972 Sweden.............................. 3963/72

[52] U.S. Cl............................ 15/250.16, 15/250.22
[51] Int. Cl............................ B60s 1/20, B60s 1/44
[58] Field of Search....... 15/250.02, 250.16, 250.22, 15/250.24, 250.25

[56] References Cited
UNITED STATES PATENTS
2,334,508  11/1943  Purden................................. 15/250
3,058,142  10/1962  Pollock............................ 15/250.02
FOREIGN PATENTS OR APPLICATIONS
1,204,276  9/1970  Great Britain........................ 15/250

Primary Examiner—Peter Feldman
Attorney, Agent, or Firm—Fleit, Gipple & Jacobson

[57] ABSTRACT

A headlight wiper is described comprising a support ring to be mounted in a stationary position on a headlight, a carrier ring rotatably mounted on the support ring, and a wiper arm which is pivotally mounted in the carrier ring and provided with a driver cooperating with a stationary guide on the support ring. The carrier ring is provided with a tooth rim adapted for engagement with a motor operated pinion. The arrangement is such that when the wiper is started the wiper arm will be swung from a substantially tangential rest position to a substantially radial working position in which it will move along the lens of the headlight through the rotary movement imparted to the carrier ring. According to the invention the stationary guide is formed by a guide groove in the support ring and a portion of the driver projects into the groove for permanent engagement therewith. Said guide groove comprises a portion which extends along a spiral line and, at its inner end, terminates in a continuous circular groove portion in the support ring.

4 Claims, 11 Drawing Figures

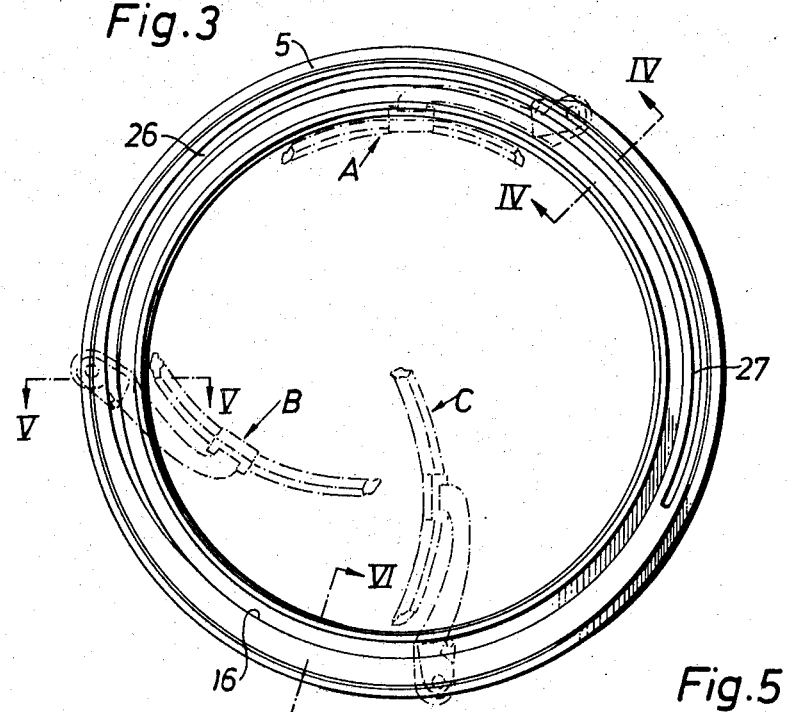
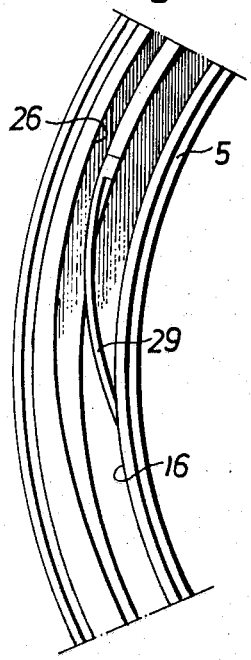
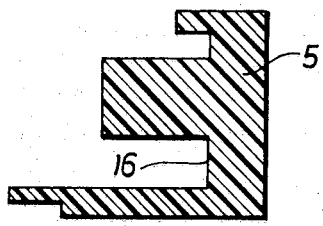
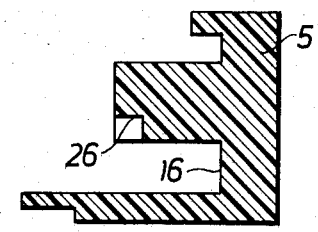
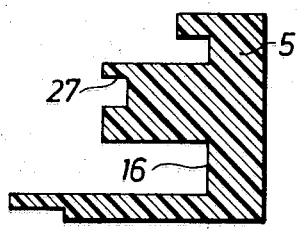

PATENTED SEP 3 1974 3,832,750

HEADLIGHT WIPER

The present invention relates to a headlight wiper which is especially intended to be used in a system for cleaning the lenses of the headlights of a vehicle. More particularly, the invention relates to a headlight wiper of the kind comprising a support ring to be mounted in a sationary position on a headlight, a carrier ring rotatably mounted on the support ring, and a wiper arm which is pivotally mounted in the carrier ring and provided with a driver cooperating with a stationary guide on the support ring, the carrier ring being provided with a tooth rim adapted for engagement with a motor-operated pinion, the arrangement being such that when the wiper is started the wiper arm will be swung from a substantially tangential rest position to a substantially radial working position in which it will move along the lens of the headlight through the rotary movement imparted to the carrier ring.

A headlight wiper of said kind is previously known through U.S. patent specification No. 3,058,142. In said known wiper the stationary guide on the support ring is formed by a cam plate which only serves to move the wiper arm from its working position to its rest position but not to cause the opposite movement of said arm. Instead the movement of the wiper arm from its rest position to its working position is obtained by means of a torsion spring mounted on the shaft of the wiper arm. This design of the known wiper involves a considerable risk for failure in the operation of the device. Firstly, the wiper arm may unintentionally be arrested in its rest position due to the possible accumulation of dust and dirt as well as the formation of ice in the bearing of the wiper arm or on the spring, so that the wiper arm will remain in its rest position even when it is released by the cam plate. Secondly, the bearing of the wiper arm will be subjected to an extensive wear as the wiper arm must move its working position to its rest position and then back to its working position each time it passes the cam plate. Since the normal working cycle comprises a plurality of revolutions this means that the wear of the bearing of the wiper arm will become a multiple of the wear caused by one single movement of the wiper arm from its rest position to its working position and back to its rest position. Another disadvantage of said known wiper is that the contact pressure between the wiper blade carried by the wiper arm and the lens of the headlight must be held at a comparatively low level to ensure that the wiper arm will immediately be swung into its radial working position when released by the cam plate. If the contact pressure in increased above said value this may result in that a portion of the surface of the headlight lens will not be wiped by the blade. However, the necessity to select a low contact pressure between the wiper blade and the lens involves the risk of an insufficient of imperfect cleaning of the lens, especially in such a weather when ice may be built up on the headlight lens.

The present invention has for its object to provide an improved headlight wiper of the kind initially mentioned which eliminates the drawbacks above accounted for. In accordance with the invention there is provided an improved wiper of said kind which is primarily characterized in that the stationary guide is formed by a guide groove in the support ring and that a portion of the driver projects into said groove for permanent engagement therewith, said guide groove comprising a portion which extends along a spiral line and, at its inner end, terminates in a continuous circular groove portion in the support ring.

The main advantage gained through the invention is that the movement of the wiper arm will be positively controlled so that it will always move from its parking position to its working position as soon as the wiper is started. The wiper arm will then remain in its working position until the cleaning cycle reaches its end and the withdrawal of the arm to its parking position is obtained through reversing the drive motor. Since the movement of the working arm between its two end positions is positively controlled in both directions it will be possible to utilize a contact pressure of sufficient magnitude to secure a very high cleaning action. In fact, the friction between the wiper blade and the headlight lens may advantageously be utilized to promote the pivoting movement of the wiper arm from its rest position to its working position and vice versa. Below the invention will be described in greater detail, reference being had to the accompanying drawing, in which:

FIG. 3 is a front view of a stationary support ring of said wiper;

FIGS. 4, 5 and 6 are sectional views taken along lines IV—IV, V—V and VI—VI, respectively, in FIG. 3;

FIG. 7 is a partial view showing, on an enlarged scale, a modified embodiment of the support ring;

Figure 2:
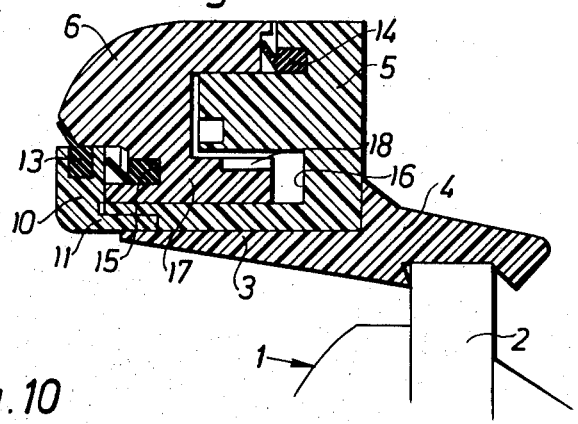
FIG. 2 is a partial view showing, on an enlarged scale, a section taken along line II—II in FIG. 1.

In the drawing reference numeral 1 generally designates a headlight having a radially projecting flange 2 on which a wiper is mounted by means of a mounting ring 3 which is provided on the rear side thereof with a plurality of axially extending resilient arms 4 arranged to be brought into snap engagement with the headlight flange 2. Reference numeral 5 designates a support ring adapted to be mounted in a fixed position on the mounting ring 4, as illustrated in FIG. 2. On the support ring 5 a carrier ring 6 is rotatably mounted to serve as a carrier for a wiper arm 7 which, at its one end, is pivotally mounted in carrier ring 6 by means of a shaft 8 and is provided with a wiper blade 9 at its free end. In order to lock carrier ring 6 against axial displacement relatively to support ring 5 the device is provided with a locking ring 10 having an axially projecting flange 11 adapted to be pressed into an annular recess 12 at the forward inner edge of the support ring. To seal the device against moisture and foreign particles it is provided with three sealing rings 13, 14 and 15 of which ring 13 is received in a circumferential groove in locking ring 10, while sealing ring 14 is located in a notch in support ring 5 and sealing ring 15 is disposed in carrier ring 6. The design and function of the different sealing rings will appear clearly from the drawing, expecially from FIG. 2. Consequently, any detailed description of said rings is not warranted here.

Figure 9:
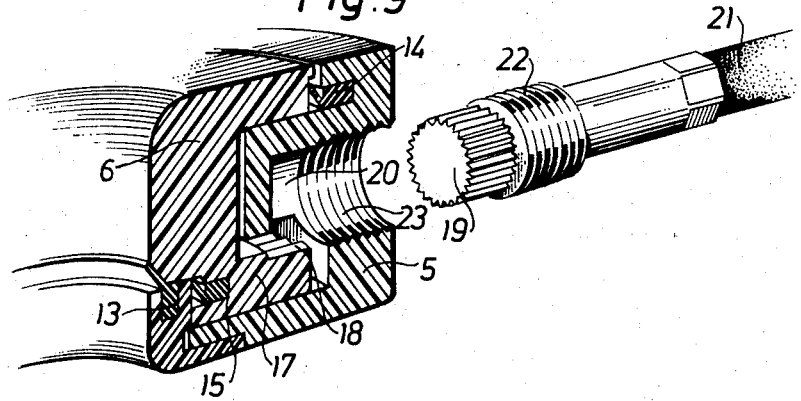
FIG. 9 is a further perspective partial view illustrating how the wiper may be connected to a drive cable.

At its rear radially inner edge carrier ring 6 is provided with an axially projecting flange 17, which is received in a circular groove 16 in support ring 5 and forms a tooth rim 18. Said tooth rim 18 is intended to be engaged and driven by a toothed pinion 19, which may be inserted into a circular cavity 20 in the support ring 5 in the manner illustrated in FIG. 9. The pinion 19 is mounted on the inner wire of a Bowden-cable 21 the tubular outer portion of which is provided with a threaded nipple 22 which may be mounted in a threaded bore 23 in support ring 5 located coaxially with said cavity 20. At its opposite end, not shown in the drawing, cable 21 is intended to be connected to a reversable electric drive motor, by means of which the carrier ring 6 may be rotated in both directions.

Figure 10:
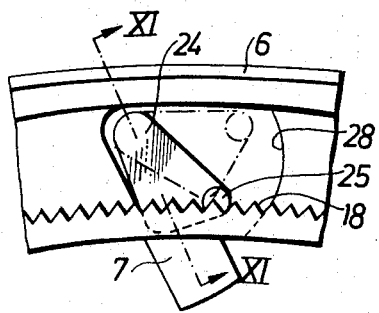
FIG. 10 is a partial rear view of a rotatable carrier ring serving to carry the wiper arm.
Figure 11:
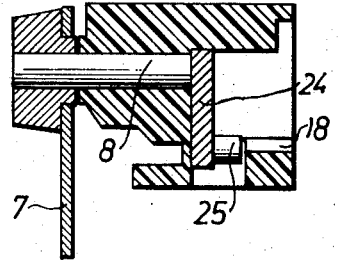
FIG. 11 is a cross-sectional view, taken along line XI-XI in FIG. 10.
Figure 8:
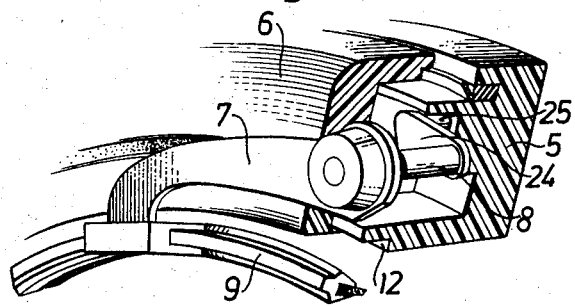
FIG. 8 is a perspective partial view showing, on an enlarged scale, the mounting of the wiper arm.

At its opposite end to wiper arm 7 shaft 8 is provided with a driver 24 mounted in a fixed position on said shaft and having the shape of a generally triangular plate. On its side turned away from shaft 8 said plate is provided with a pin 25 which is radially displaced from shaft 8. Said pin 25 projects into a guide groove in support ring 5. In the illustrated embodiment, said guide groove comprises an inner portion formed by the circular groove 16, an intermediate portion 26 extending along a spiral line from groove 16, and an outer, comparatively short portion 27 which extends along a part-circular arc coaxially with groove 16. As can be seen from FIGS. 10 and 11, the driver 24 is received in a recess 28 at the rear side of carrier ring 5. Said recess permits a limited rotation of driver 24 and wiper arm 7 between the two end positions illustrated in full lines and in dash-dotted lines in FIG. 10 and the first of which corresponds to a position C (FIG. 3) of the wiper arm in which said arm extends in a substantially radial direction over the lens of headlight 1, while the last mentioned position corresponds to a rest position A for the wiper arm 7 in which said arm and the wiper blade extend in a substantially tangential direction along the periphery of the headlight lens.

Figure 1:
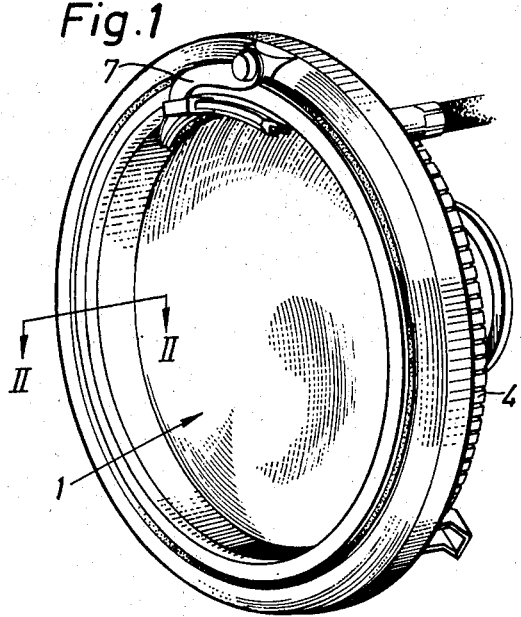
FIG. 1 shows a perspective view of a headlight wiper according to one embodiment of the invention.

The manner of operation of the wiper will be explained below. Before actuation of the wiper takes place the wiper arm 7 and the wiper blade 9 will be located in position A adjacent to the circumferential edge of the headlight lenses. Pin 25 of driver 24 is now located in portion 27 of the guide groove. Through energizing the drive motor connected to cable 21 the carrier ring 6 may be caused to rotate in a counter-clockwise direction according to FIGS. 1 and 3. This will cause pin 25 to move from goove portion 27 into the spiral groove portion 26. The wiper arm 7 will hereby be successively turned around shaft 8 and then pass the intermediary position B shown in FIG. 3. When pin 25 leaves groove portion 26 and is received in the circular inner groove 16 in support ring 5 the wiper arm has reached its final angular position designated C in FIG. 3. During the continued rotation of the carrier ring 6 in counter-clockwise direction the wiper blade will remain in this working position and successively wipe the entire surface of the headlight lens.

When the carrier ring has been rotated through at least two or three complete revolutions with the wiper arm in its working position C the drive motor is reversed, whereupon pin 25 will enter the spiral groove portion 26 as soon as it reaches the transition between said groove portion and the circular groove 16 in support ring 5. The wiper arm will then be successively turned back to its rest position A. During this movement of the wiper arm the carrier ring 6 rotates in a clockwise direction according to FIGS. 1 and 3. The frictional force exerted on wiper blade 9 due to its contact with the headlight lens will ensure that pin 25 will move into groove portion 26 and that it will not continue to move within groove 16 when passing the transition between said groove and groove portion 26. Although said frictional force may be sufficient under all practical circumstances to cause the desired movement of pin 25 a curved leaf spring 29 may be provided at said transition in the manner illustrated in FIG. 7 to force pin 25 to enter groove portion 26 as soon as carrier ring 6 is rotated in a clockwise direction. When the carrier ring is rotated in the opposite direction spring 29 will become resiliently deflected each time pin 25 passes the same and thereby permit the desired free passage for said pin.

Above it has been mentioned that the frictional force between the wiper blade and the headlight lens contributes to move the wiper arm from its working position to its rest position. In corresponding manner said fricional force will also contribute to the movement of the wiper arm from its rest position to its working position when the carrier ring is rotated in counter-clockwise direction.

What we claim is:

1. A headlight wiper comprising a support ring to be mounted in a stationary position on a headlight, a carrier ring rotatably mounted on the support ring, and a wiper arm which is pivotally mounted in the carrier ring and provided with a driver cooperating with a stationary guide on the support ring, the carrier ring being provided with a tooth rim adapted for engagement with a motor operated pinion, the arrangement being such that when the wiper is started the wiper arm will be swung from a substantially tangential rest position to a substantially radial working position in which it will move along the lens of the headlight through the rotary movement imparted to the carrier ring, characterized in that the stationary guide is formed by a guide groove in the support ring and that a portion of the driver projects into said groove for permanent engagement therewith, said guide groove comprising a portion which extends along a spiral line and, at its one end, terminates in a continuous circular groove portion in the support ring.

2. A headlight wiper according to claim 1, characterized in that at its other end the spiral groove portion terminates in a groove portion having a constant radius of curvature.

3. A headlight wiper according to claim 1, characterized in that the tooth rim on the carrier ring is received in a circular groove in the support ring, said circular groove including the circular portion of the guide groove, the tooth rim being located at a greater depth in said groove than the projecting portion of the driver.

4. A headlight wiper according to claim 1, characterized in that a resiliently deflectable guide member, in the shape of a curved leaf spring, is provided at the transition between the spiral portion of the guide groove and the circular groove to ensure that the projecting portion of the driver will move from the circular groove into the spiral groove portion when passing said transition during rotation of the carrier ring in a backward direction.

* * * * *